Dec. 19, 1961  J. A. WILSON  3,013,825
WIRE LINE STRIPPER
Filed Dec. 8, 1958

INVENTOR
James A. Wilson
BY
*Ashley & Ashley*
ATTORNEYS

_United States Patent Office_ 3,013,825
Patented Dec. 19, 1961

3,013,825
WIRE LINE STRIPPER
James A. Wilson, Dallas, Tex., assignor to Equipment Engineers, Inc., Dallas, Tex., a corporation of Texas
Filed Dec. 8, 1958, Ser. No. 778,894
8 Claims. (Cl. 286—16)

This invention relates to new and useful improvements in wire line strippers.

One object of the invention is to provide improved means for stripping well fluids from a wire line or cable as it is withdrawn from a well bore and which is so constructed that wear of its means for sealing off around the cable or line is substantially uniform and the life thereof prolonged.

Another object of the invention is to provide an improved wire line stripper having pressure-operated means for uniformly deforming a packing element into frictional engagement with a wire line whereby the element wears evenly and maintains the line centered with respect to the stripper so as to permit extended use of said element and eliminate the necessity for frequent replacement thereof.

A particular object of the invention is to provide an improved wire line stripper, of the character described, wherein the packing element is confined within a complementary housing in surrounding relation to the wire line and the pressure-operated means is adapted to apply a compressive force axially to said element whereby the compressive force is equally distributed throughout the deformed element for urging the same into uniform engagement with the line to produce even wear of said element.

An important object of the invention is to provide an improved wire line stripper, of the character described, which is capable of being remotely operated at a safe distance therefrom so as to eliminate the hazard of being in close proximity to the stripper and facilitate actuation thereof when it is not safely accessible due to its position, or the danger resulting from slackness or kinking of the cable or line, or the presence of relatively high well pressures.

A further object of the invention is to provide an improved packing element for sealing off around a wire line or cable to confine well pressures during the running of a device on the line or cable into and out of a well under pressure.

A construction designed to carry out the invention will be hereinafter described, together with other features of the invention.

Figure 1:
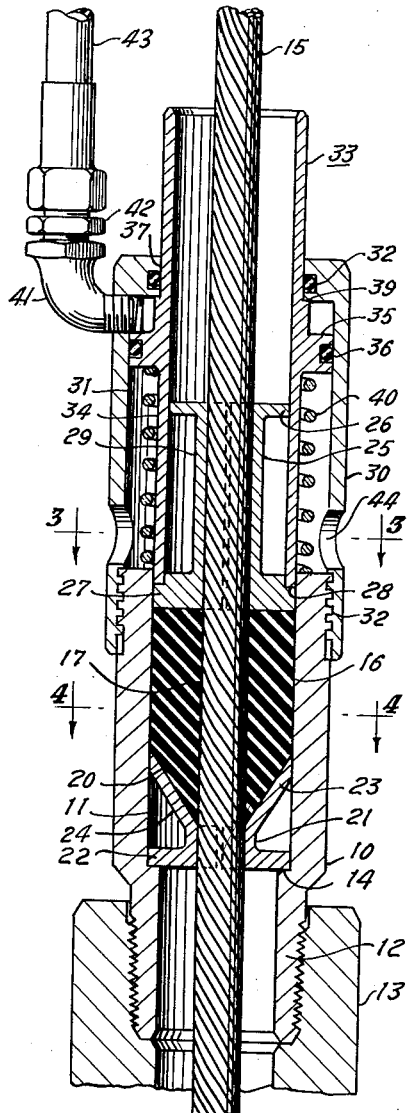
Figure 2:
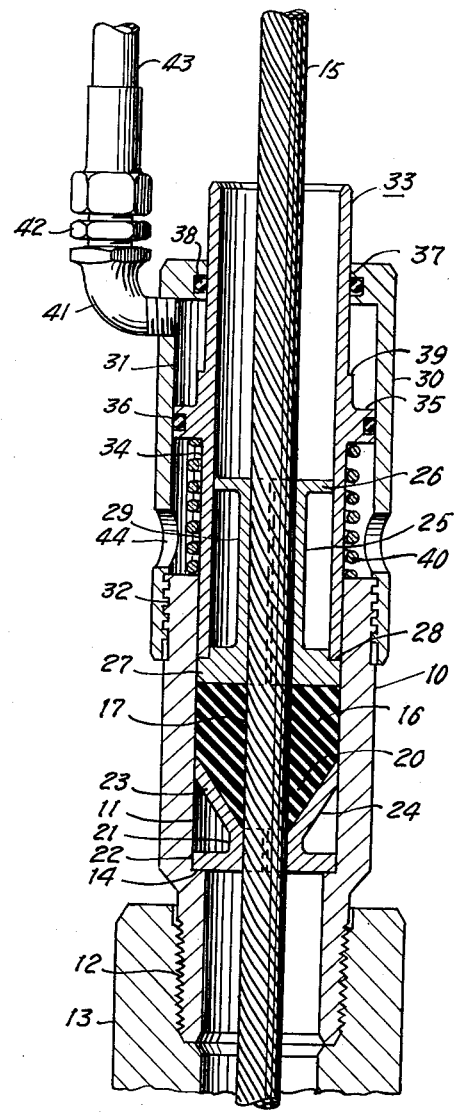
Figure 3:
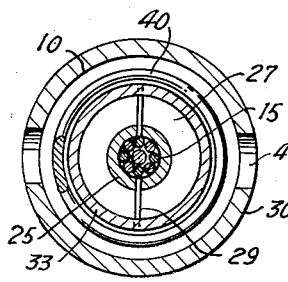
Figure 4:
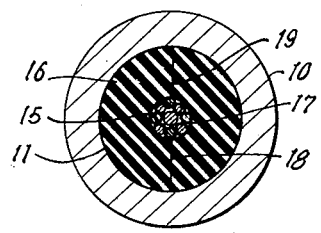

The invention will be more readily understood from a reading of the following specification and by reference to the accompanying drawing, wherein an example of the invention is shown, and wherein:

FIG. 1 is a longitudinal, sectional view of a wire line stripper constructed in accordance with the invention, FIG. 2 is a view, similar to FIG. 1, showing the packing element deformed into frictional engagement with a wire line, FIG. 3 is a horizontal, cross-sectional view, taken on the line 3—3 of FIG. 1, and FIG. 4 is a horizontal, cross-sectional view, taken on the line 4—4 of FIG. 1.

In the drawing, the numeral 10 designates the upright cylindrical body or housing of a wire line stripper having a cylindrical bore 11 extending therethrough. An axial, screw-threaded nipple or pin 12 depends from the housing 10 for connection with the upper end of a well pipe or member 13 and an annular, radial shoulder 14 is formed in the bore 11 adjacent the pin. For sealing or frictional engagement with a wire line or cable 15 extending axially through the bore of the housing, a cylindrical packing element 16 is confined within said bore and includes a tubular body of rubber or other elastic or resilient material and of greater length than diameter. The body has an axial bore 17 of slightly greater diameter than the wire line 15 and an external diameter substantially equal to the diameter of the bore 11. A slit 18 extends longitudinally of the body to permit its engagement around the wire line (FIG. 4); however, as shown by the numeral 19, the slit may extend diametrically and divide the body into halves. The body has a flat upper end and a frusto-conical or tapered lower end 20 for seating in a complementary guide bushing 21.

An external, radial flange 22 is formed on the lower end of the bushing 21 for resting on the shoulder 14 to support the packing element 16, while a frusto-conical flange or upwardly-flaring thimble 23 is provided at the upper end of said bushing to receive the complementary lower end 20 of said element. The bushing is annular and has an internal diameter slightly greater than the diameter of the wire line, being split longitudinally in the usual manner to provide sections or halves 24 for engagement around said line, and the external diameters of its flanges 22 and 23 are substantially equal to the diameter of the bore 11. An elongated, cylindrical guide bushing 25 overlies the packing element and has external, radial flanges 26 and 27 at its upper and lower ends formed by eliminating unnecessary metal. The lower flange has an external diameter substantially equal to the diameter of the housing bore for slidable engagement therewith and its upper peripheral portion is recessed to provide an annular, upwardly-facing shoulder 28. As will be explained, the external diameter of the upper flange 26 is substantially equal to the diameter of the recessed portion of the lower flange. In order to permit positioning around the wire line, the bushing 25 is split longitudinally to provide a pair of coacting halves or sections 29 (FIG. 3). It is noted that the bushings are formed of brass or other bearing metal and that the bushing 25 projects above the housing and its bore.

A cylindrical cap 30, having an axial bore or chamber 31 of a diameter substantially equal to the external diameter of the housing 10, is detachably connected to the upper end of said housing by large or coarse screwthreads 32 and forms a continuation or extension of said housing. The bore 31 functions as a cylinder for a pressure-operated member 33 which includes an elongated, tubular piston member or plunger 34 having internal and external diameters substantially equal to the respective diameters of the bushing flange 26 and bore 11. An external, radial flange or shoulder 35 is provided on the plunger 34 intermediate its ends for slidable engagement with the wall of the bore or cylinder 31 and carries an O-ring or other seal ring 36 in its periphery. The lower end of the plunger bears against the shoulder 28 of the lower bushing flange 27 for slidable engagement with the bore 11 and extends upwardly therefrom in surrounding relation to the bushing 25 and its upper flange 26. An axial opening 37 is formed in the closed upper end or top of the cap 30 and has an O-ring or other seal ring 38 for sealing engagement with the upper end portion of the plunger which projects through the opening. To limit upward movement of the plunger, an external, radial shoulder 39 is provided by increasing the diameter of said plunger immediately above its flange 35.

A helical spring 40 surrounds the lower portion of the plunger and is confined in the bore 31 between the flange 35 and the upper end of the housing 10 so as to constantly urge said plunger upwardly. The plunger is adapted to be forced downwardly to deform the packing element 16 into sealing engagement with the wire line 15 by air or other fluid under pressure from a suitable source (not shown). An elbow or other fitting 41 communicates with the upper end of the bore or cylinder 31 above the flange of the plunger and is adapted to be connected by a coupling 42 to a conductor or hose 43 extending from the source of pressure fluid. In order to facilitate the tightening of the square screwthreads 32 as well as permit the exhaust of pressure fluid trapped below the flange 35, diametrically-opposed openings 44 are formed in the lower portion of the cap 30 immediately above said screwthreads.

The stripper is assembled as shown in FIG. 1 wherein the packing element is relaxed or undeformed due to the plunger 33 being held in its upper position by the spring 40. Since the bore 17 of the packing element is of greater diameter than the wire line 15, said line may be freely lowered or raised without any binding or stripping action. When it is desired to strip well fluids from the line as it is withdrawn, or when it is desired to run the line in under well pressure, fluid under pressure is supplied to the upper end of the cylinder 31 by means of the fitting 41 and hose 43. The pressure of the fluid is exerted against the upper surface of the flange 35 and forces the plunger downwardly. As shown in FIG. 2, the upper bushing 25 moves downwardly with the plunger and deforms the packing element into frictional engagement with the wire line and the complementary bore 11. Due to this tight engagement, the well fluids clinging to the line are stripped therefrom by the element when said line is pulled upwardly. It is noted that additional pressure fluid is supplied to the cylinder to increase the downward movement of the plunger and upper bushing upon wear of the packing element and that appreciable wear of said element is illustrated in FIG. 2. Also, the deformation of the packing element and its frictional engagement with the wire line may be readily varied by raising and lowering the plunger when running and pulling devices on said line under well pressures.

Since the bushing flange 27 is complementary to the upper end of the packing element 16, the compressive force of the pressure fluid is applied to the entire area of said element so as to uniformly deform the same. As a result, all of the elastic body of the element is under compression and is urged into engagement with the line equally in all directions. Due to the frusto-conical lower end 20 of the body and the complementary flange 23 of the bushing 21, the deformation of said body is directed inwardly so as to more efficiently seal off around the line. Manifestly, the bore of the body wears evenly due to the equal distribution of the compressive force throughout said body so as to prevent undue wear of the guide bushings and cutting of the plunger or any part of the stripper by the wire line. It is pointed out that the stripper may be remotely-operated at a safe distance from the well so as to control relatively high well pressures. Due to the coarse screwthreads 32, the cap 30 may be readily detached from the housing 10 to permit inspection and/or replacement of the packing element and guide bushings. Whenever desired, the stripping action may be discontinued by exhausting the fluid from the cylinder 31 through the fitting 41 and hose 43. The force of the spring 40 lifts the plunger and assists in exhausting the pressure fluid.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In a wire line stripper having a housing with a bore through which a wire line is adapted to extend, a packing element supported by the housing for sealing off around the wire line, a tubular fluid actuated member above the packing element for deforming said element into sealing position, and a guide bushing having a lower end portion interposed between the member and element and an upper portion extending into said member, said guide bushing being cylindrical and having external radial flanges at its lower and upper end portions which are complementary to said element and the interior of said member, respectively, whereby the major intermediate portion of said bushing is spaced from said member.

2. In a wire line stripper having a housing with a bore through which a wire line is adapted to extend, a packing element supported by the housing for sealing off around the wire line, a tubular fluid actuated member above the packing element for deforming said element into sealing position, and a guide bushing having a lower end portion complementary to said element and interposed between the member and element, the guide bushing having an upper end portion complementary to and extending into said member, said guide bushing having an external shoulder for engagement by said member.

3. In a wire line stripper as set forth in claim 2 wherein the packing element is complementary to and confined by the bore of the housing, the guide bushing being separate from the fluid actuated member and element, the lower end portion of said bushing being complementary to and slidable in the housing bore and axially spacing said member and element, said bushing and element having axial bores of substantially equal diameter.

4. In a wire line stripper as set forth in claim 3 wherein the fluid actuated member has a lower portion complementary to and slidable in the bore of the housing.

5. In a wire line stripper as set forth in claim 2 wherein the packing element has a tapered lower end, a second guide bushing seated in the bore of the housing below said element and having an upper end portion complementary to the tapered lower end of said element, said second bushing having an axial bore of substantially the same diameter as the bore of said element and a lower end portion complementary to and confined by the housing bore.

6. In a wire line stripper as set forth in claim 5 wherein the packing element and each of said guide bushings are split axially.

7. In a wire line stripper as set forth in claim 5 wherein the first-mentioned guide bushing has its major intermediate portion spaced from the fluid actuated member, and the second guide bushing has its major intermediate portion spaced from the bore of the housing.

8. In a wire line stripper as set forth in claim 2 wherein the packing element has a frusto-conical lower end, and a second guide bushing seated in the bore of the housing and underlying said element, the second guide bushing having an upwardly flaring thimble at its upper end complementary to the frusto-conical lower end of said element for mating engagement therewith, said second bushing having its lower end complementary to and confined by the housing bore, said element and each of said bushings being split axially.

References Cited in the file of this patent
UNITED STATES PATENTS

| | | |
|---|---|---|
| 2,559,321 | Seamark | July 3, 1951 |
| 2,564,912 | McKissick | Aug. 21, 1951 |
| 2,806,721 | Fagg et al. | Sept. 17, 1957 |